US011780730B2

(12) United States Patent
Ulber et al.

(10) Patent No.: US 11,780,730 B2
(45) Date of Patent: Oct. 10, 2023

(54) CORROSION-PROTECTED REFORMER TUBE WITH INTERNAL HEAT EXCHANGE

(71) Applicant: L'Air Liquide, Societe Anonyme pour l'Etude et l'Exploitation des Procedes Georges Claude, Paris (FR)

(72) Inventors: Dieter Ulber, Steinbach (DE); Sebastien Doublet, Vauhallan (FR); Pascal Del-Gallo, Dourdan (FR); Laurent Prost, Gif-sur-Yvette (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 577 days.

(21) Appl. No.: 16/470,720

(22) PCT Filed: Nov. 21, 2017

(86) PCT No.: PCT/EP2017/025341
§ 371 (c)(1),
(2) Date: Jun. 18, 2019

(87) PCT Pub. No.: WO2018/114049
PCT Pub. Date: Jun. 28, 2018

(65) Prior Publication Data
US 2019/0337801 A1    Nov. 7, 2019

(30) Foreign Application Priority Data
Dec. 19, 2016    (EP) ..................... 16400061

(51) Int. Cl.
*C01B 3/38* (2006.01)
*B01J 8/02* (2006.01)
*B01J 8/06* (2006.01)

(52) U.S. Cl.
CPC ............... *C01B 3/384* (2013.01); *B01J 8/025* (2013.01); *B01J 8/062* (2013.01); *B01J 8/065* (2013.01);
(Continued)

(58) Field of Classification Search
CPC .. C01B 3/384; B01J 8/025; B01J 8/062; B01J 8/065; B01J 8/067; B01J 2208/00991
(Continued)

(56) References Cited

U.S. PATENT DOCUMENTS

| 11,351,517 B2 | 6/2022 | Ulber et al. |
| 2002/0187091 A1 | 12/2002 | Deevi |
| 2015/0076410 A1* | 3/2015 | Schlichting ............. C01B 3/388 252/373 |

FOREIGN PATENT DOCUMENTS

| EP | 1 193 219 | 4/2002 |
| EP | 3 296 255 | 3/2018 |

(Continued)

OTHER PUBLICATIONS

International Search Report and Written Report for PCT/EP2017/025341, dated Feb. 9, 2018.
(Continued)

*Primary Examiner* — Douglas B Call
(74) *Attorney, Agent, or Firm* — Justin K. Murray

(57) ABSTRACT

A reformer tube for producing synthesis gas by steam reforming of hydrocarbon-containing input gases is proposed where
an outer shell tube is divided by means of a separating tray into the reaction chamber and an exit chamber,
a dumped bed of a steam-reforming-active, solid catalyst is arranged in the reaction chamber,
at least one heat exchanger tube is arranged inside the reaction chamber and inside the dumped catalyst bed whose entry end is in fluid connection with the catalyst bed and whose exit end is in fluid connection with the exit chamber, wherein
gas-contacted parts of the reformer tube, in particular the at least one heat exchanger tube, are fabricated from a nickel-based alloy and coated on their inside with an aluminum diffusion layer.

13 Claims, 1 Drawing Sheet

(52) U.S. Cl.
CPC ...... *B01J 8/067* (2013.01); *B01J 2208/00991* (2013.01); *B01J 2208/065* (2013.01); *C01B 2203/0233* (2013.01); *C01B 2203/0811* (2013.01); *C01B 2203/0883* (2013.01); *C01B 2203/1241* (2013.01)

(58) Field of Classification Search
USPC ......................................................... 252/373
See application file for complete search history.

(56) References Cited

FOREIGN PATENT DOCUMENTS

| GB | 1 149 163 | | 4/1969 |
|----|-----------|---|--------|
| GB | 2 066 696 | | 7/1981 |
| JP | 2006 028566 | | 2/2006 |
| WO | WO 92 15653 | | 9/1992 |
| WO | WO 2005/021814 | * | 3/2005 |
| WO | WO 2013/068416 | | 5/2013 |
| WO | WO 2018 050291 | | 3/2018 |
| WO | WO 2018 114049 | | 6/2018 |

OTHER PUBLICATIONS

Higman, Christopher, "Synthesis Gas Processes for Synfuels Production," presented at EUROGAS '90, Trondheim, Jun. 1990, http://www.higman.de/gasification/papers/eurogas.pdf., 10 pgs.

Aguero, A., et al., "Metal Dusting Protective Coatings. A Literature Review," Oxid Met (2011) 76:23-42.

Anonymous, "INCOLOY alloy 803—data sheet", (Sep. 1, 2004), XP055690641.

Labanowski, et al., "The Effect of Long Term Service at Elevated Temperatures on Microstructure Degradation of Austenitic Reformer Tubes," Advances in Materials Science, (Jun. 1, 2018), vol. 18, No. 2, doi:10.1515/adms-2017-0029, pp. 27-36, XP055894099.

* cited by examiner

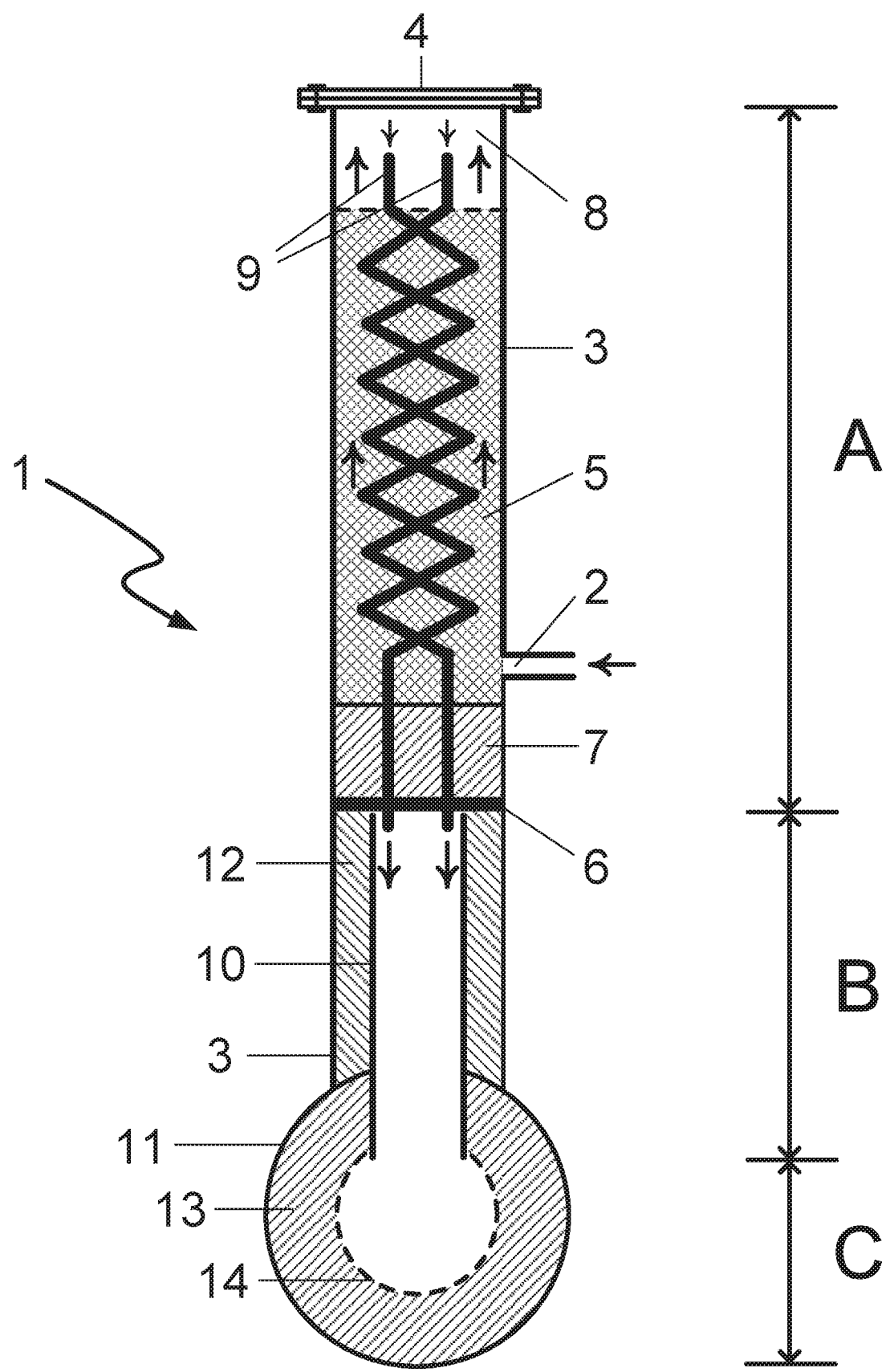

CORROSION-PROTECTED REFORMER TUBE WITH INTERNAL HEAT EXCHANGE

CROSS REFERENCE TO RELATED APPLICATIONS

This application is a § 371 of International PCT Application PCT/EP2017/025341, filed Nov. 21, 2017, which claims the benefit of EP16400061.4, filed Dec. 19, 2016, both of which are herein incorporated by reference in their entireties.

FIELD OF THE INVENTION

The invention relates to a reformer tube for converting hydrocarbon-containing input materials, preferably natural gas and light liquid hydrocarbons such as naphtha, into a synthesis gas product comprising carbon oxides and hydrogen. The reformer tube according to the invention enables internal heat exchange between the input gas and the product gas partially converted into synthesis gas products, thus giving rise to advantages in terms of energy consumption during production of synthesis gas and the products of value hydrogen and carbon monoxide. Said tube is further provided with a corrosion-protection layer which shall efficaciously prevent so-called metal dusting corrosion.

The invention further relates to a process for producing synthesis gas by steam reforming of hydrocarbon-containing input materials using the reformer tube according to the invention and to a reformer furnace provided with a reformer tube according to the invention.

BACKGROUND

Hydrocarbons maybe catalytically reacted with steam to afford synthesis gas, i.e. mixtures of hydrogen ($H_2$) and carbon monoxide (CO). As is explained in Ullmann's Encyclopedia of Industrial Chemistry, Sixth Edition, 1998 Electronic Release, keyword "Gas Production" so-called steam reforming is the most commonly employed method of producing synthesis gas which may then be converted into further important commodity chemicals such as methanol or ammonia. While different hydrocarbons, such as for example naphtha, liquid gas or refinery gases may be converted, it is steam reforming of methane-containing natural gas that dominates.

Steam reforming of natural gas is highly endothermic. It is therefore performed in a reformer furnace in which numerous catalyst-containing reformer tubes in which the steam reforming reaction takes place are arranged in parallel. The outer walls of the reformer furnace and its ceiling and floor are faced or lined with a plurality of layers of refractory material which withstands temperatures of up to 1200° C. The reformer tubes are usually fired with burners mounted on the top or bottom or on the side walls of the reformer furnace and directly heat the interspace between the reformer tubes. Heat transfer to the reformer tubes is effected by heat radiation and convective heat transfer from the hot flue gases.

After pre-heating by heat exchangers or fired heaters to about 500° C. the hydrocarbon-steam mixture enters the reformer tubes after end-heating to about 500° C. to 800° C. and is therein converted into carbon monoxide and hydrogen over the reforming catalyst Nickel-based reforming catalysts are widespread. While higher hydrocarbons are fully converted into carbon monoxide and hydrogen, in the case of methane partial conversion is typical. The composition of the product gas is determined by the reaction equilibrium; the product gas thus comprises not only carbon monoxide and hydrogen but also carbon dioxide, unconverted methane and water vapor. For energy optimization or for input materials comprising higher hydrocarbons a so-called pre-reformer for pre-cracking the input material may be employed downstream of the pre-heater. The pre-cracked input material is then heated to the desired reformer tube entry temperature in a further heater.

The hot synthesis gas product gas is partially cooled in one or more heat exchangers after leaving the reformer furnace. The partially cooled synthesis gas product gas then passes through further conditioning steps dependent on the type of the desired product or of the downstream process.

Steam reforming of natural gas is notable for its high energy requirements. The prior art therefore already contains proposals which aim to minimize external energy requirements through optimized process design, for example through energy recovery. For instance Higman demonstrated a so-called HCT reformer tube with internal heat exchange in the EUROGAS-90 conference, Trondheim, June 1990, also disclosed at http://www.higman.de/gasification/papers/eurogas.pdf (Retrieved 27 Sep. 2011), This comprises an outer catalyst-filled and next to the heated reformer tube where the input gas flows through the catalyst bed from top to bottom. Inside the catalyst bed are two coiled double helix heat exchanger tubes made of a suitable material through which the partially reformed gas flows after leaving the catalyst bed, thus transferring a portion of its sensible heat to the steam reforming process taking place over the catalyst. However a disadvantage here is the higher pressure drop on account of the longer route of the gas through the coiled heat exchanger tubes. Furthermore, a type of corrosion elucidated hereinbelow referred to as "metal dusting" moreover becomes more markedly apparent since longer sections of the heat exchanger tubes are subjected to the temperature range relevant for metal dusting corrosion.

At high temperatures CO and hydrocarbons have a propensity for dissociating on metal and thereby depositing carbon on the metal surface. The carbon is then converted into the solid phase and extracts the susceptible metals from their homogeneous solid matrix, thus resulting in pitting and finally in mechanical collapse of the materials. This results in high maintenance costs and can cause serious safety problems for example through bursting of pressurized conduits and apparatuses and/or through escape of toxic carbon monoxide.

As is taught in the paper "Metal Dusting Protective Coatings. A Literature Review", A. Agüero et al., Oxid Met (2011) 76:23-42, metal dusting is a type of corrosive disintegration of metals and alloys into fine particles. Materials susceptible for this form of corrosive attack include in particular iron, nickel, cobalt and alloys thereof. Metal dusting occurs at high temperatures of approximately 400° C. 800° C. and in gas atmospheres comprising in particular carbon monoxide (CO) or hydrocarbons. Under industrially customary conditions in steam reforming below 400° C. the thermodynamic potential for the metal dusting reaction is high but the reaction rate low. Above 800° C. the thermodynamic potential for metal dusting is so low that it does not occur to any appreciable extent. Metal dusting is therefore often observed in steam reforming processes and all plant parts, in particular equipment parts in the waste heat sector, coming into contact with the generated synthesis gas in the recited temperature range.

The precursor for metal dusting is the formation of elemental carbon from carbon sources such as CO and $CH_4$.

The main reactions for carbon formation from CO and methane arise from the following reaction equations.

$$2CO = C + CO_2 \quad (1a)$$

$$CO + H_2 = C + H_2O \quad (2a)$$

$$CH_4 = C + 2H_2 \quad (3a)$$

The thermodynamic potential for the above reactions to proceed from left to right, i.e. for carbon formation, is represented by the so-called carbon activity $a_C$ which is calculated for these three reactions as:

$$a_{C1} = K_{p1}(p_{CO})^2/p_{CO2} \quad (1b)$$

$$a_{C2} = K_{p2} p_{CO} p_{H2}/p_{H2O} \quad (2b)$$

$$a_{C3} = K_{p3} p_{CH4}/(p_{H2})^2 \quad (3b)$$

wherein $K_{pi}$ is the equilibrium constant for the relevant reaction and $p_i$ is the partial pressure of the relevant gas. When the activity $a_C$ is greater than 1 carbon has a thermodynamic potential to form via the relevant reaction although the extent of carbon formation may be limited by the kinetics of the reaction. When $a_C$ is less than one graphite formation does not take place on account of the thermodynamics. It follows from the above equations that $a_C$ is a function of temperature and of the partial pressures of the gases involved. In other words $a_C$ is a function of the temperature, of the gas compositions and in some cases of the absolute pressure of the gas mixture.

A plurality of mechanisms have been proposed in the literature for metal dusting of Fe- and Ni-based materials. Some assume that intermediate metal carbides are formed which subsequently decompose into carbon and metal dust. Reference is made to the literature, for example the above-mentioned paper, for details.

The occurrence of metal dusting may be retarded or even prevented by application of a corrosion-suppressing coating onto the alloy surface. Typically employed here are either diffusion coatings or coverings/covering layers based on the formation of a thin, stable, protective and adherent layer based on the elements aluminium, chromium or silicon. Presently, aluminium diffusion coatings are most commonly employed for oxidation and corrosion protection in the chemical industry at high temperatures. Said coatings are formed when an alloy is coated with a metal or a metal mixture at a temperature high enough to allow diffusion of the metal(s) into the surface of the substrate. This gives rise to a metallurgical bond with a substrate material and the coating then becomes an integral constituent of the substrate material. Disadvantages include the high production cost and complexity and the limited lifetime of diffusion coatings, for example by volatilization of the protective metal by evaporation, by abrasion thereof by solid particles in the reactant or product gas stream or else by increased and deeper diffusion of the protective metal, for example aluminium, into the volume of the workpiece to be protected. This diffusion process reduces the surface concentration of the protective metal and efficacious corrosion protection is thus no longer provided.

SUMMARY OF THE INVENTION

It is accordingly an object of the present invention to specify a reformer tube having favorable properties in terms of energy recovery by internal heat exchange while at the same time having minimized corrosion susceptibility for metal dusting corrosion.

Reformer Tube According to an Embodiment of the Invention:

Reformer tube for converting hydrocarbon-containing input materials, preferably natural gas, into a synthesis gas product comprising carbon oxides and hydrogen under steam reforming conditions comprising (a) an outer, pressurized shell tube, wherein the shell tube is divided into a reaction chamber and an exit chamber by means of a separating tray and wherein the reaction chamber is externally heatable, (b) a dumped bed of a steam-reforming-active solid catalyst arranged in the reaction chamber, (c) an entry for the input gas stream comprising the input material arranged in the region of the reaction chamber, wherein the entry for the input gas stream is in fluid connection with the dumped catalyst bed, (d) at least one heat exchanger tube arranged inside the reaction chamber and inside the dumped catalyst bed whose entry end is in fluid connection with the catalyst bed and whose exit end is in fluid connection with the exit chamber, wherein the input gas stream after entry into the reaction chamber initially flows through the catalyst bed and subsequently flows through the heat exchanger tube in countercurrent and is thus continually cooled and wherein the heat exchanger tube is in a heat exchange relationship with the dumped catalyst bed and the input gas stream flowing therethrough, (e) a collection conduit for the synthesis gas product which is in fluid connection with the exit chamber, characterized in that the gas-contacted metallic components of the reformer tube are made of a nickel-based alloy and those gas-contacted surfaces having a temperature during operation under defined steam reforming conditions of between 650° C. and 800° C., preferably between 680° C. and 750° C., most preferably between 690° C. and 720° C., are equipped with an aluminium diffusion layer.

It is a further object of the present invention to provide a process with which the reformer tube according to the invention may be operated such that its corrosion protection potential may be fully exploited and a high service life may be achieved. This object is achieved by a process having the features of claim 9. Here too, further embodiments of the process according to the invention are apparent from the dependent claims.

Process According to an Embodiment the Invention:

Process for producing synthesis gas by catalytic steam reforming of hydrocarbon-containing input materials, preferably natural gas, under steam reforming conditions in the presence of a steam-reforming-active, solid catalyst comprising the steps of:

(a) provision of an input gas stream comprising the input material and addition of reforming steam, wherein a steam-carbon ratio S/C arises from the molar ratio of the supplied reforming steam amount and the carbon present in the input material, (b) catalytic conversion of the input material under steam reforming conditions into a synthesis gas products comprising carbon oxides and hydrogen, (c) discharging and optional workup of the synthesis gas product, characterized in that the catalytic conversion in step (b) is effected in a reformer tube according to claim 1 at defined steam reforming conditions, in particular in terms of the steam/carbon ratio S/C and the reforming temperature, wherein the gas-contacted metallic components of the reformer tube are made of a nickel-based alloy and those gas-contacted surfaces having a temperature between 650°

C. and 800° C., preferably between 680° C. and 750° C., most preferably between 690° C. and 720° C., are equipped with an aluminium diffusion layer.

The invention further relates to a reformer furnace provided with the reformer tube according to the invention.

Fluid connection between two regions of the reformer tube is to be understood as meaning any type of connection whatsoever which makes it possible that a fluid, for example the input gas stream or the synthesis gas product stream, can flow from the one to the other of the two regions, neglecting any interposed regions or components.

Heat exchange relationship is to be understood as meaning the possibility of heat exchange or heat transfer between two regions of the reformer tube, wherein all mechanisms of heat exchange or heat transfer such as heat conduction, heat radiation or convective heat transport may come into effect.

Steam reforming conditions are to be understood as meaning the process conditions known per se to a person skilled in the art, in particular of temperature, pressure and residence time, as recited by way of example above and hereinbelow and discussed in detail in the relevant literature and under which at least partial conversion but preferably industrially relevant conversions of the reactants into synthesis gas products such as CO and hydrogen is effected.

The steam reforming conditions are typically defined in terms of a target composition of the synthesis gas product. Important parameters are the steam/carbon ratio (S/C ratio), the entry pressure into the reformer tube and the reforming temperature. However, fine adjustment of the steam reforming conditions may also be undertaken such that the critical temperature ranges occur at those component surfaces that are equipped with an aluminium diffusion layer.

The reforming temperature is to be understood as meaning the maximum temperature of the gas flowing through the reformer tube which arises from the interaction between the heat transport processes and the endothermic reforming reaction. It serves as a basis for calculating the reforming equilibrium. In the context of the present invention the reforming temperature corresponds to the temperature of the gas shortly before entry into the heat exchanger tubes.

Gas-contacting components and gas-contacted surfaces are to be understood as meaning those components and surfaces which during operation of the reformer tube according to the invention come into contact with the gaseous reactants or products of the reforming reaction.

The invention is based on the finding that under industrially customary conditions in steam reforming for a reformer tube with internal heat exchange the gas-contacted surfaces of metallic components may be efficaciously protected from metal dusting corrosion by provision with an aluminium diffusion layer. This protective measure develops its full efficacy when under defined operating conditions/steam reforming conditions of the reformer tube, in particular in terms of the steam/carbon ratio S/C and the reforming temperature, those surfaces of gas-contacted metallic components having a surface temperature between 650° C. and 800° C., preferably between 680° C. and 750° C., most preferably between 690° C. and 720° C., are equipped with an aluminium diffusion layer.

It has been found that under industrially customary conditions in steam reforming above approximately 700° C. metal dusting corrosion occurs only to a very small extent, if at all, on account of the equilibrium position of the reactions involved. Combined with this is the finding that in aluminium diffusion layers above approximately 700° C. increased and accelerated diffusion of aluminium into the volume of the metallic component to be protected occurs, wherein the propensity for diffusion is largely independent of the steam reforming conditions. This results in an increase in thickness of the aluminium diffusion layer with a simultaneous reduction in the aluminium concentration in this layer, thus impairing the efficacy of the layer as corrosion protection.

By contrast, under industrially customary conditions in steam reforming below approximately 700° C. metal dusting corrosion is promoted on account of the equilibrium position of the reactions involved and also proceeds sufficiently rapidly in terms of the reaction kinetics to result in significant material destruction over industrially relevant service lives. However, diffusion of aluminium into the volume of the underlying metal component to be protected, and thus aluminium loss from the protective layer, is sufficiently slow for industrially adequate service lives for an aluminium diffusion layer having a sufficient aluminium concentration and a component protected with such a layer are achieved before significant corrosion requiring replacement of the component occurs.

Preferred Embodiments of the Invention

It is preferable when in the reformer tube according to the invention those regions of the inner wall of the at least one heat exchanger tube having a surface temperature between 650° C. and 800° C., preferably between 680° C. and 750° C., most preferably between 690° C. and 720° C., are equipped with an aluminium diffusion layer. The progressive cooling of the gas stream as it flows through the heat exchanger tube on account of the indirect heat exchange with the input gas stream flowing through the dumped catalyst bed has the result that recited temperature ranges occur in particular on the inside/inner wall of the heat exchanger tube so that provision with a corrosion protection layer is particularly useful here.

A further embodiment of the reformer tube according to the invention is characterized in that the inner wall of the at least one heat exchanger tube is fully equipped with an aluminium diffusion layer. It is true that, as discussed above, the regions of the inner wall of the heat exchanger tube having a temperature above the recited temperature ranges undergo comparatively rapid loss of aluminium by diffusion into the metallic substrate. However, in terms of metal dusting corrosion this is harmless since said corrosion only proceeds on a minor scale, if at all, above the recited temperature ranges. In addition the fabrication cost and complexity and for such a heat exchanger internally fully equipped with an aluminium diffusion layer is lower since it is not necessary to first define which regions of the inner wall of the heat exchanger tube need be equipped with the aluminium diffusion layer and which regions by contrast need not. Furthermore, a higher flexibility for use of the heat exchanger tube is achieved since alteration of the reforming conditions can shift the position of the critical temperature ranges on the inner wall of the heat exchanger tube.

In a further aspect of the invention those surfaces of gas-contacted metallic components of the reformer tube having surface temperatures during operation under defined steam reforming conditions in the range from 800° C. to 400° C., preferably from 750° C. to 400° C., most preferably from 720° C. to 400° C., are also equipped with an aluminium diffusion layer. Below approximately 400° C. the kinetics of the reactions involved are sufficiently slow that metal dusting corrosion essentially no longer plays any role over industrially relevant service lives and corrosion protection measures are thus obviated.

In the reformer tube according to the invention the at least one heat exchanger tube preferably consists of a nickel-based alloy. These alloys feature good corrosion and/or high-temperature resistance (creep strength). In addition the reformer tube according to the invention is preferably equipped on the inside and on the outside with an aluminium diffusion layer. This measure increases the fabrication cost and complexity only insignificantly but offers additional protection when in unusual modes of operation of the reformer tube, for example during startup, shutdown or during outages, temperatures critical for metal dusting corrosion also occur on the outer wall of the heat exchanger tube.

It is particularly preferable when in the reformer tube according to the invention a sufficient amount of aluminium is applied to the inner wall of the at least one heat exchanger tube to ensure that the aluminium concentration in the diffusion layer is at least 20 wt %, particularly preferably at least 30 wt %. Material analyses have shown that a sufficient corrosion resistance of the workpieces provided with an aluminium diffusion layer over 8000 operating hours under steam reforming conditions is obtained when these aluminium concentrations are adhered to.

Alternatively or in addition as is preferred when, based on the customary dimensions of the employed heat exchanger tubes, a sufficient amount of aluminium is applied to ensure that the aluminium concentration in the alloy based on the metal volume of the coated heat exchanger tube is at least 4 wt %, preferably at least 5 wt %. A sufficient corrosion resistance of the workpieces provided with an aluminium diffusion layer over 8000 operating hours under steam reforming conditions is also obtained with this criterion, as was shown with the aid of material analyses.

It is particularly preferred when the reformer tube according to the invention is provided with a helical coiled heat exchanger tube and preferably two heat exchanger tubes are present which are arranged in the dumped catalyst bed in the shape of a double helix. This embodiment of the reformer tube a represents a favorable compromise between apparatus cost and complexity and favorable heat transfer properties.

In a particular embodiment of the process according to the invention the performance thereof uses at least one heat exchanger tube where those regions of the inner wall having a surface temperature between 650° C. and 800° C., preferably between 680° C. and 750° C., most preferably between 690° C. and 720° C. are equipped with an aluminium diffusion layer. The progressive cooling of the gas stream as it flows through the heat exchanger tube on account of the indirect heat exchange with the input gas stream flowing through the dumped catalyst bed has the result that recited temperature ranges occur in particular on the inside/inner wall of the heat exchanger tube so that provision with a corrosion protection layer is particularly useful here.

It is preferable when during performance of the process according to the invention those surfaces of gas-contacted metallic components of the reformer tube having surface temperatures during operation under defined steam reforming conditions in the range from 800° C. to 400° C., preferably from 750° C. to approximately 400° C., most preferably from 720° C. to approximately 400° C., are also equipped with an aluminium diffusion layer. Below approximately 400° C. the kinetics of the reactions involved are sufficiently slow that metal dusting corrosion essentially no longer plays any role over industrially relevant service lives and corrosion protection measures are thus obviated.

In a particular embodiment of the process according to the invention the inner wall of the at least one heat exchanger tube is fully equipped with an aluminium diffusion layer. It is true that, as discussed above, the regions of the inner wall of the heat exchanger tube having a temperature above the recited temperature ranges undergo comparatively rapid loss of aluminium by diffusion into the metallic substrate. However, in terms of metal dusting corrosion this is harmless since said corrosion only proceeds on a minor scale, if at all, above the recited temperature ranges. In addition the fabrication cost and complexity and for such a heat exchanger internally fully equipped with an aluminium diffusion layer is lower since it is not necessary to first define which regions of the inner wall of the heat exchanger tube need be equipped with the aluminium diffusion layer and which regions by contrast need not. Furthermore, a higher flexibility for use of the heat exchanger tube is achieved since alteration of the reforming conditions can shift the position of the critical temperature ranges on the inner wall of the heat exchanger tube.

The invention also comprehends a reformer furnace comprising refractorily lined or refractorily faced walls, a ceiling and a floor and an interior formed thereby, characterized in that at least a one reformer tube according to claims 1 to 8 and at least one burner for heating the reformer tube are arranged in the interior or in a secondary space in fluid connection with the interior in respect of the burner flue gases.

In a particular embodiment of the reformer furnace according to the invention the at least one reformer tube is arranged in the interior in free-hanging or free-standing fashion, wherein the portion of the shell tube comprising the reaction chamber is arranged in the interior and are the portion of the shell tube comprising the exit chamber is at least partially fed through the ceiling or the floor. In free-hanging or free-standing fashion is to be understood as meaning in this connection that only the end of the reformer to comprising the exit chamber is in mechanical contact with the ceiling or the floor of the reformer furnace.

This is particularly favorable since in this way thermo-mechanical stresses between the entry for the impact gas stream and the exit for the synthesis gas product stream which arise on account of the considerable temperature differences in the reformer tubes known from the prior art are avoided. In the case of the latter, costly and complex measures, for example the use of stress compensators (so-called pigtails) or of control cables, are employed to compensate the stresses and their negative effects, for example deformation of the reformer tube. This is no longer necessary for the free-hanging or free-standing arrangement of the reformer tube.

In a further preferred embodiment of the reformer furnace according to the invention a multiplicity of reformer tubes and burners are arranged in the interior such that the longitudinal axes of the flames generated by the burners are oriented parallel to the longitudinal axes of the reformer tubes. This makes it possible to ensure that a burner achieves uniform heating of the reformer tubes arranged around it. Furthermore the parallel flame axes supply radiated heat to the reformer tubes over a longer distance and local overheating of the outsides of the reformer tubes is avoided.

BRIEF DESCRIPTION OF THE DRAWINGS

Developments, advantages and possible applications of the invention are apparent from the following description of exemplary embodiments and the drawing. All described and/or depicted features on their own or in any desired combination form the subject matter of the invention, irrespective of the way in which they are combined in the claims and the way in which said claims refer back to one another.

The FIGURE shows a reformer tube according to a preferred embodiment of the invention.

DETAILED DESCRIPTION OF THE INVENTION

The reformer tube according to the invention depicted in the FIGURE is divided into the sections A (reaction chamber), B (exit chamber) and C (collection conduit).

Via entry conduit 2 desulfurized natural gas together with reforming steam enters the reaction chamber A arranged in the upper portion of the shallow tube 3. The shell tube consists of a nickel-chromium steel for example of the type G-X45NiCrNbTi3525. The entry temperature of the input gas is 600° C., the space velocity based on the catalyst volume is typically 4000 to 5000 mN$^3$/(m$^3$ h).

In the present exemplary embodiment the reformer tube is arranged vertically with the open tube end of the shell tube 3 in the upper position and is externally heated by means of burners (not shown in the FIGURE). During operation of the reformer tube the open tube end of the shell tube is sealed with a sealing apparatus 4, for example a flanged lid, which may be opened for overhauls and for charging and discharging of the catalyst.

After entry into the shell tube the natural gas and the reforming steam enter the catalyst bed 5 which is formed from particles of a solid, nickel-based reforming catalyst. The input materials then flow upwards through the catalyst bed as indicated by flow arrows. The catalyst bed is secured in the shell tube by means of separating tray 6. Located between the separating tray and the dumped catalyst bed is a dumped bed of inert bodies 7 as a support for the catalyst.

The endothermic steam reforming reaction takes place over the reforming catalyst. After leaving the catalyst bed the partially converted natural gas which comprises not only carbon oxides and hydrogen but also unconverted methane enters an open space 8 arranged at the sealed tube end 4 of the shell tube. The partially converted input gas stream subsequently enters the entry end of the coiled heat exchanger tube 9 arranged inside the dumped catalyst bed. The gas stream flowing through the heat exchanger tubes 9 gives up in countercurrent a portion of its sensible heat to the dumped catalyst bed and the input gas stream flowing through said bed. The heat exchanger tubes are made of nickel-based alloys having good resistance against metal dusting corrosion, for example Alloy 601, 602 CA, 617, 690, 692, 693, HR 160, HR 214 or so-called multilayer materials where the tubes are coated with tin-nickel or aluminium-nickel alloys. In addition, the heat exchanger tubes are provided on their insides and preferably also on the outsides with an aluminium diffusion layer as a corrosion protection layer.

After flowing through the heat exchanger tubes the synthesis gas product stream enters the exit chamber B. To this end the exit ends of both heat exchanger tubes 9 are fed through the separating tray 6 and thus secured. They then open with their exit ends into the inner tube 10 which provides the connection between the heat exchanger tubes 9 and the collection conduit 11. The inner tube is likewise fabricated from one of the abovementioned metallic materials of construction and its inner wall and preferably also its outer wall are provided with an aluminium diffusion layer as a corrosion protection layer. A gas-permeable insulating material 12 is attached between the outer wall of the inner tube and the inner wall of the shell tube.

The inner tube 10 is connected with the collection conduit 11 (section C) which is provided on its inside with insulating material 13 and/or a corrosion-resistant, for example ceramic, coating 14. The synthesis gas product stream is discharged from the reformer tube 1 via the collection conduit and is sent for further processing. Depending on the intended use of the synthesis gas product this may comprise a carbon monoxide conversion, a gas scrubbing operation for removal of carbon dioxide, a pressure swing adsorption for hydrogen removal and further processing stages.

Numerical Example (Invention)

A reformer tube according to the invention is operated under steam reforming conditions over an operating time of 8000 operating hours. The reforming temperature was 820° C., the S/C ratio was 3.6, the entry pressure into the reforming tube was 33 bar absolute. The reforming tube was provided with two helically coiled heat exchanger tubes made of a nickel-based alloy and provided on their inner walls with an aluminium diffusion layer.

After termination of reformer operation one of the heat exchanger tubes was deinstalled and material samples of its inner wall were withdrawn at various longitudinal sections. Due to the temperature profile determined the respective longitudinal coordinates correspond to different steady-state temperatures.

The samples withdrawn were subjected to metallographic analysis in respect of their surface morphology and by means of SEM/EDS measurements (energy dispersive x-ray analysis) to determine the thickness and composition of the aluminium diffusion layer. None of the samples withdrawn showed any sign of metal dusting corrosion. In particular neither pitting nor any appearance of cracks the in protective layer was observed.

Table 1 summarizes the thus measured layer thicknesses and average aluminium contents in the protective layer. It is apparent from the table that above 673° C. and in particular above 818° C. under the specified operating conditions a marked increase in thickness of the aluminium diffusion layer coupled with simultaneous reduction in the average aluminium contents in this layer is observed.

TABLE 1

Layer thicknesses and average aluminium contents in the protective layer for samples from various sections of the inside of a heat exchanger tube after 8000 operating hours under steam reforming conditions

| Temperature ° C. | Layer thickness μm | Average Al content wt % |
|---|---|---|
| 627 | 143 | 34 |
| 650 | 149 | |
| 673 | 149 | |
| 696 | 174 | |
| 725 | 170 | |
| 740 | 177 | |
| 818 | 254 | 21 |

The two samples obtained at 627° C. and 818° C. analyzed in more detail in respect of their horizontal layer structure. Table 2 summarizes the thus obtained local aluminium contents as a function of distance from the surface (depth).

It is clearly apparent that the higher surface temperature results in a broadening/increase in thickness of the aluminium diffusion layer and the aluminium content decreases over the first 100 μm. One exception is the Al content measured directly at the surface.

TABLE 2

Local aluminium contents as a function of distance from the surface into the inside of the workpiece (depth) for samples obtained at 627° C. and 818° C.

| Depth μm | Sample at T = 627° C. Local Al content wt % | Sample at T = 818° C. Local Al content wt % |
|---|---|---|
| 0 | 25 | 37 |
| 25 | 35 | 24 |
| 50 | 37 | 23 |
| 75 | 35 | 22 |
| 100 | 34 | 20 |
| 125 | 20 | 20 |
| 150 | 4 | 19 |
| 175 | 0 | 17 |
| 200 | 0 | 4 |
| 225 | 0 | 6 |
| 250 | 0 | 3 |
| Average value | 34 | 21 |

Table 3 summarizes the calculated Boudouard temperatures when operating the steam reforming plant at various S/C ratios and reforming temperatures. The Boudouard temperature defined as the temperature at which the activity as per equation (2a) is one.

It is apparent from table 3 that the Boudouard temperature decreases with increasing S/C ratio and decreasing reforming temperature. Above the respective Boudouard temperature i.e. at an activity as per equation (2a) of less than one, metal dusting corrosion no the takes place to any appreciable extent since a thermodynamic potential therefor is no longer present.

TABLE 3

Boudouard temperature when operating the steam reforming plant at various S/C ratios and reforming temperatures

| | S/C | Reforming temperature ° C. | Boudouard temperature ° C. |
|---|---|---|---|
| Case 1 | 3.1 | 900 | 783 |
| Case 2 | 3.3 | 870 | 763 |
| Case 3 | 3.5 | 840 | 742 |
| Case 4 | 3.8 | 810 | 718 |
| Case 5 | 4.1 | 780 | 693 |

Comparative Example

A reformer tube was operated under the same steam reforming conditions over an operating time of 8000 operating hours as in the numerical example according to the invention. The reformer tube was provided with two helical coiled heat exchanger tubes without an aluminium diffusion layer.

After termination of reformer operation one of the heat exchanger tubes was in turn deinstalled and material samples of its inner wall were withdrawn at various longitudinal sections which due to the determined temperature profile correspond to different steady-state temperatures. The withdrawn samples thus corresponded to the temperatures reported hereinbelow, the respective accompanying Boudouard activity as per equation (2b) being reported in brackets: 623° C. (9.8), 644° C. (5.8), 663° C. (3.7), 685° C. (2.2), 696° C. (1.7), 706° C. (1.3)

These samples were also analyzed in respect of their surface morphology. Signs of corrosion were clearly apparent in all samples and propensity for corrosion decreased with increasing temperature in line with the Boudouard activity which fell in the same direction. The sample responding to 623° C. showed extreme corrosion while by contrast the sample corresponding to 706° C. exhibited only minor corrosion.

At even higher temperatures where Boudouard activity falls below 1 significant metal dusting corrosion is no longer to be expected.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

INDUSTRIAL APPLICABILITY

The invention proposes a reformer tube enabling internal heat exchange between the input gas and the product gas partially converted into synthesis gas products, thus giving rise to advantages in terms of energy consumption during use of the reformer tube. The inventive provision of the reformer tube with an aluminium diffusion layer as a corrosion protection layer makes it possible to effectively counteract metal dusting corrosion when in particular the metallic components and the regions of the reformer tube having a surface temperature in the recited critical ranges are appropriately equipped. This results in a possible longer operating time of the reformer tube and thus in economic advantages. Corrosion protection for regions of the reformer tube having a surface temperature above the recited critical ranges is also obviated, thus permitting cost savings for costly and complex material treatment.

LIST OF REFERENCE NUMERALS

[1] Reformer tube
[2] Entry conduit
[3] Shell tube
[4] Sealing apparatus
[5] Dumped catalyst bed
[6] Separating tray
[7] Dumped bed of inert bodies
[8] Open space
[9] Heat exchanger tubes
[10] Inner tube
[11] Collection conduit
[12] Insulating layer
[13] Insulating layer
[14] Coating
[A] Reaction chamber
[B] Exit chamber
[C] Collection conduit

The invention claimed is:

1. A reformer tube for converting a hydrocarbon-containing feed into a synthesis gas product comprising carbon oxides and hydrogen under steam reforming conditions, the reformer tube comprising:
  (a) an outer, pressurized shell tube, wherein the outer, pressurized shell tube is divided into a reaction chamber and an exit chamber by means of a separating tray and wherein the reaction chamber is externally heatable;
  (b) a dumped bed of a steam-reforming-active solid catalyst arranged in the reaction chamber;
  (c) an entry for an input gas stream comprising an input material arranged in the region of the reaction chamber, wherein the entry for the input gas stream is in fluid connection with the dumped catalyst bed;
  (d) at least one heat exchanger tube arranged inside the reaction chamber and inside the dumped catalyst bed whose entry end is in fluid connection with the catalyst bed and whose exit end is in fluid connection with the exit chamber, wherein the input gas stream after entry into the reaction chamber initially flows through the catalyst bed and subsequently flows through the heat exchanger tube in countercurrent and is thus continually cooled and wherein the heat exchanger tube is in a heat exchange relationship with the dumped catalyst bed and the input gas stream flowing therethrough; and
  (e) a collection conduit for the synthesis gas product which is in fluid connection with the exit chamber,
  wherein gas-contacted metallic components of the reformer tube are made of a nickel-based alloy, wherein each gas-contacted metallic component has a gas-contacted surface, wherein the gas-contacted surfaces having a temperature during operation under defined steam reforming conditions of between 650° C. and 800° C. are equipped with an aluminum diffusion layer that is configured to retard corrosion of the gas-contacted surfaces.

2. The reformer tube according to claim 1, wherein at least one heat exchanger tube is made of a nickel-based alloy and is equipped on the inside and on the outside with an aluminum diffusion layer.

3. The reformer tube according to claim 1, wherein a sufficient amount of aluminum is applied to the inner wall of the at least one heat exchanger tube to ensure that the aluminum concentration in the diffusion layer is at least 20 wt %.

4. The reformer tube according to claim 1, wherein the at least one heat exchanger tube is helically coiled along at least a portion of a length of the at least one heat exchanger tube.

5. The reformer tube according to claim 1, wherein at least two exchanger tubes are arranged inside the dumped catalyst bed.

6. The reformer tube according to claim 1, wherein the separating tray is configured to provide gaseous separation between the reaction chamber and the exit chamber except for the input gas stream flowing through the at least one heat exchanger tube from the reaction chamber to the exit chamber.

7. The reformer tube according to claim 1, wherein the separating tray is secured in place by the separating tray.

8. The reformer tube according to claim 1, wherein the separating tray comprises an absence of perforations that allow gaseous flow directly from the reaction chamber into the exit chamber.

9. The reformer tube according to claim 1, wherein the separating tray is configured to prevent gaseous flow directly from the reaction chamber into the exit chamber.

10. A reformer furnace comprising refractorily lined or refractorily faced walls, a ceiling and a floor, an interior formed thereby, at least a one reformer tube according to claim 1, and at least one burner for heating the reformer tube is arranged in the interior or in a secondary space in fluid connection with the interior in respect of the burner flue gases.

11. The reformer furnace according to claim 10, wherein the at least one reformer tube is arranged in the interior in free-hanging or free-standing fashion, wherein the portion of the outer, pressurized shell tube comprising the reaction chamber is arranged in the interior and the portion of the outer, pressurized shell tube comprising the exit chamber is at least partially fed through the ceiling or the floor.

12. The reformer furnace according to claim 10, wherein a multiplicity of reformer tubes and burners are arranged in the interior such that the longitudinal axes of the flames generated by the burners are oriented parallel to the longitudinal axes of the reformer tubes.

13. A process for producing synthesis gas by catalytic steam reforming of hydrocarbon-containing input materials under steam reforming conditions in the presence of a steam-reforming-active, solid catalyst comprising the steps of:
  a. provision of an input gas stream comprising the input material and addition of reforming steam, wherein a steam-carbon ratio S/C arises from the molar ratio of the supplied reforming steam amount and the carbon present in the input material,
  b. catalytic conversion of the input material under steam reforming conditions into a synthesis gas products comprising carbon oxides and hydrogen, wherein the steam reforming conditions comprise operating temperatures between 650° C. and 800° C. for the gas-contacted surfaces,
  c. discharging and optional workup of the synthesis gas product,
  wherein the catalytic conversion in step (b) is effected in a reformer tube according to claim 1.

* * * * *